United States Patent [19]
Kowaleski et al.

[11] Patent Number: 5,172,922
[45] Date of Patent: Dec. 22, 1992

[54] SELF ALIGNING VACUUM NOZZLE

[75] Inventors: Kelli L. Kowaleski, Arlington; Yuen-Foo M. Kou, Melrose, both of Mass.; Gary D. Roberts, Hollis, N.H.

[73] Assignee: Digital Equipment Corporation, Maynard, Mass.

[21] Appl. No.: 691,630

[22] Filed: Apr. 25, 1991

[51] Int. Cl.[5] .............................. B25J 15/06
[52] U.S. Cl. ...................... 279/3; 294/64.1; 414/737; 414/752; 901/40
[58] Field of Search .................. 279/3; 294/64.1; 285/261, 262, 114, 9.2; 901/40; 414/737, 752

[56] References Cited

U.S. PATENT DOCUMENTS

| | | | |
|---|---|---|---|
| 916,025 | 3/1909 | Royer | 285/262 X |
| 1,649,616 | 11/1927 | Roth | 285/262 X |
| 1,883,279 | 10/1932 | Zerk | 285/9.2 |
| 2,850,279 | 9/1958 | Stouthoff et al. | 294/64.1 X |
| 3,008,385 | 11/1961 | Pierce . | |
| 3,165,899 | 1/1965 | Shatto . | |
| 3,223,442 | 12/1965 | Fawdry et al. | 294/64.1 |
| 3,463,329 | 8/1969 | Gartner . | |
| 3,648,853 | 3/1972 | Winne . | |
| 3,834,555 | 9/1974 | Bennington et al. . | |
| 3,912,317 | 10/1975 | Ohnaka . | |
| 3,958,740 | 5/1976 | Dixon . | |
| 4,078,671 | 3/1978 | Lundstrom . | |
| 4,266,905 | 5/1981 | Birk et al. . | |
| 4,364,707 | 12/1982 | Ott . | |
| 4,537,085 | 8/1985 | Valentine . | |
| 4,553,892 | 11/1985 | Huffman et al. . | |
| 4,557,514 | 12/1985 | Cushman et al. . | |
| 4,572,564 | 2/1986 | Cipolla . | |
| 4,600,228 | 7/1986 | Tarbuck . | |
| 4,657,470 | 4/1987 | Clarke et al. . | |

FOREIGN PATENT DOCUMENTS 2245064 4/1973 Fed. Rep. of Germany ...... 284/262
1445957 12/1988 U.S.S.R. .............................. 294/64.1

OTHER PUBLICATIONS

Document entitled "Automatic Tilt Adjusting Robot End-Effector", ME 210 Masters Design Project 1987/88, by Tom Lofgren, Mark Werlich, Hewon Hwang, dated Jun. 8, 1988.

*Primary Examiner*—Steven C. Bishop
*Attorney, Agent, or Firm*—William P. Skladony; Ronald E. Myrick; Barry N. Young

[57] ABSTRACT

This invention relates to a self aligning, vacuum end effector which is capable of picking up objects which have a pick up surface which is not planar with the pick up surface of the end effector. The end effector is comprised of two parts: a nozzle base which fixedly attaches to an automatic assembly device, such as robotic arm; and a nozzle tip, which is the part of the end effector which actually comes in contact with the object to be picked up. The nozzle base and nozzle tip are secured together by a retention spring. The nozzle tip has a generally, semi-spherically shaped ball portion which is partly inserted into a bore within the nozzle base and rests against a quad ring which is secured within the bore. Consequently, when the nozzle tip makes contact with an object which is to be picked up and moved, the semi-spherical ball portion of the nozzle tip slides against the quad ring and the nozzle tip pivotally moves and aligns itself with the plane of the surface of the object to be picked up. Hollowed through the center of both parts of the end effector is a passageway through which a vacuum source supplied by the robotic arm can be effected at the contact surface of the nozzle tip, so that the object can be picked up.

23 Claims, 2 Drawing Sheets

SELF ALIGNING VACUUM NOZZLE

FIELD OF THE INVENTION

This invention relates to a vacuum nozzle which can be used in automated assembly operations, and more particularly it relates to a nozzle which is capable of pivoting movement for picking up components which are positioned such that the plane of the surface by which they are picked up is not aligned with the plane formed by the pick up surface of the nozzle.

BACKGROUND OF THE INVENTION

Automated assembly operations, especially those incorporating robots in the assembly process, are widely used in many manufacturing applications. The assembly of computer circuit boards, which are populated with a wide variety of electronic components, is one such example of an assembly process which employs the use of robots. During the manufacture of circuit boards, electronic components are typically picked up by a robot at one stage, and moved to a different stage of the assembly process for the purpose of integrating those components into a higher level assembly. One fairly common method of picking up a component is to have a robotic arm fitted with a vacuum nozzle, also known as an "end effector", lowered into physical contact with the component, at which time a vacuum force causes the component to adhere to the nozzle tip. The component can then be picked up and moved by the robotic arm to the next stage for further processing.

In many such automated operations the end effector is designed so that it is fixed and does not move in any way, other than the movement imparted by the robotic arm (ie. the up and down motion as a component is picked up, for example). Such unmovable end effectors are normally fixed into position such that the plane formed by the pick up surface of the end effector is aligned with the plane formed by the pick up surface of the component's packaging. Accordingly, when the end effector is lowered onto the component a vacuum seal can be created by the aligned planar contact of the end effector with the component. Although such automated assembly processes are designed for this planar alignment of the end effector and the components, sometimes a misalignment occurs such that the plane formed by the contact surface of the end effector and the plane formed by the pick up surface of the component may be at different angles. This differing alignment of the planes formed by these surfaces shall hereinafter be referred to as "unaligned" or "non-aligned" planes or surfaces.

There are a number of factors which may cause these surfaces to be unaligned. For example, many electronic components which generate a considerable amount of heat during operation have heat sinks attached to them for the purpose of heat dissipation. During the manufacturing of the component a thermally conductive glue is placed between the packaging of the electronic component and the heat sink, so that the heat sink adheres to the package. Due to tolerances in this manufacturing process there may be an uneven distribution of glue between the package and the component resulting in the plane formed by the surface of the heat sink and the plane formed by the surface of the packaging of the electronic component being unaligned. Given that during the automated assembly process such components are typically picked up by the heat sink, non-alignment between the heat sink and the component packaging usually translates to non-alignment between the end effector and the heat sink.

Other factors that may contribute to the non-alignment of the surface of the component that is being picked up and the end effector could be the non-alignment of the surface of the component itself, which could thereby cause the heat sink to be unaligned even if the glue is distributed evenly. Or, non-alignment may result from the way the component is positioned in the carrier which carries the component under the robot on the assembly table, and the non-alignment of the carrier, itself. All of these factors, especially when taken in combination, can cause the non-alignment of the pick up surface of an unmovable end effector with the surface of the component which it is intended to pick up.

The consequence of this non-alignment of surfaces is that an end effector which is unmovable is more likely to miss picking up the component when lowered onto the component because the end effector is unable to make an adequate vacuum seal with the pick up surface of the component. The non-alignment causes the vacuum to escape as the tip of the end effector fails to make a flush contact with the component. Accordingly, the productivity of the automated assembly process is impaired as the components do not get processed as intended.

A general solution to this unalignment problem is to design the end effector so that it can adjust to and align with the planar surface of the component that is being picked up. One known approach to aligning a vacuum end effector to the component is shown in U.S. Pat. No. 4,600,228, issued to Tarbuck on Jul. 15, 1986. This patent covers a lockable compliant end effector apparatus useful with a robotic arm for the automated assembly of electronic equipment. The apparatus includes a main body portion which has a socket formed in one end in which a spherical member is received substantially therein and is mounted for pivoting movement. The socket and the spherical member have roughened surfaces in proximity to a fluid passageway which is formed through both such members. A retainer member is removably connected to the end of the main body portion in such a way that the spherical member is retained in the socket, but is capable of pivotally moving. The pivoting movement of the spherical member within the socket enables the end effector to align with the surface of the component to be picked up.

The apparatus shown in Tarbuck further involves the use of an air bearing which enables the spherical member to float in order to align with the component to be picked up. In order to create this air bearing the apparatus first uses a positive air flow, which forces the spherical member down and away from the socket. When the spherical member is lowered onto the component that is being picked up, the spherical member is forced into contact with the socket. A sensor which can determine air pressure build up causes the downward motion of the robotic arm to stop, at which point the direction of the air pressure reverses from a positive direction to a negative direction. Once the negative air pressure, or vacuum, is applied, the roughened surfaces of the main body and the socket are kept in contact with each other, thereby locking the end effector and component in place.

The invention shown in Tarbuck also involves the use of a flow adjustment member which is rotatably mounted in a bore which extends through the spherical member. The flow adjustment member is alignably adjusted relative to the passageway through which the positive and the negative air pressure is applied.

While Tarbuck shows the use of a socket and spherical member for the purpose of aligning the tip of an end effector with a component, a need exists for a simpler device which is easy to make and does not require the use of positive and negative air pressure or the use of refined adjustments to the end effector apparatus.

SUMMARY OF THE INVENTION

The present invention relates to a vacuum nozzle, or end effector, which is capable of picking up components which have a pick up surface which may not be aligned with the pick up surface of the end effector. The end effector is comprised of two basic parts; the first is a nozzle base, which can be attached at one end to a robotic arm, and the second part is a nozzle tip. Disposed through the longitudinal center of the nozzle base is a bore which forms a vacuum passageway. At the other end of the nozzle base is a cavity or bore enlargement, in which a portion of the second part of the nozzle is positioned. Thus, the nozzle base bore terminates at one end with the part of the nozzle base which is attached to the robotic arm, and at the other end at the bore enlargement. The end which attaches to the robotic arm is fitted with a quad ring which has a diameter large enough to encircle the perimeter of the bore, and thereby assists with creating an air tight seal between the nozzle base and the robotic arm when the two are attached. At the other end of the nozzle base, the bore enlargement is fitted with a radially, inwardly protruding, quad ring having a central opening of a given diameter.

The second part of the vacuum nozzle is a nozzle tip. One end of the nozzle tip is generally semi-spherically shaped. This portion of the nozzle tip is positioned in the end of the nozzle base having the bore enlargement such that the semi-sphere makes contact with the interior opening of the quad ring set inside the bore enlargement. When so positioned, the contact of the semi-spherical member against the opening of the quad ring enables the nozzle tip to pivotally move. The second end of the nozzle tip, the portion which comes in contact with the component, forms a generally planar, contact surface. Fitted within a recess in the contact surface is another quad ring which assists in establishing an air tight seal when the end effector contacts the component.

Like the nozzle base, the nozzle tip also has a bore forming a vacuum passageway disposed through its longitudinal center such that when the nozzle base and nozzle tip are attached, the vacuum passageways of the nozzle base and nozzle tip align. Therefore, when the end effector is attached to the robotic arm, and the robotic arm supplies a vacuum source, the negative air pressure of the vacuum is communicated through the vacuum passageways of the nozzle base and the nozzle tip to effect a vacuum at the tip of the end effector which contacts the component.

The semi-sphere of the nozzle tip is held within the bore enlargement of the nozzle base through a retention spring which is attached at one of its ends to the nozzle base and at the other end to the nozzle tip, and is disposed in the vacuum passageways of these two parts of the nozzle, that is, on the longitudinal center line of the assembly.

In operation, when the end effector is lowered onto the component the nozzle tip will contact the top surface of the component. Under contact pressure from the component, the nozzle tip will pivotally move and orient itself to the surface of the component which is being picked up. During such movement the semi-spherical portion of the nozzle tip will slidably abut the inner perimeter of the quad ring set inside the bore enlargement. With the vacuum applied, the quad ring within the bore enlargement will maintain a vacuum seal between the nozzle body and the semi-spherical portion of the nozzle tip. Thus, the nozzle tip can adjust itself to the non-aligned orientation of the surface of the component and effect a vacuum seal, even though the surface of the component may be unaligned with the original orientation of the nozzle tip.

It is an object of the invention to have an end effector for picking up non-aligned components which is inexpensive, easy to manufacture, easy to use, and reliable. A feature of the present invention is that the end effector has a movable tip which can pivot in order to orient itself so that it can pick up a component with an unaligned surface. An advantage of the present invention is that it does not require an air bearing in order to enable it to pivotally adjust to the surface of the component which it is picking up; therefore, it does not require the additional apparatus necessary to create the positive air flow. Moreover, because no such air bearing is needed for pivotal movement, a further advantage is that the present invention does not require a sensor to determine when to reverse the direction of the air flow. Yet a further advantage is that the present invention does not require the refinement of the degree of air flow within the end effector through a flow adjustment member.

Other objects, features, and advantages of the present invention will be further appreciated and better understood on consideration of the detailed description of the preferred embodiment, presented below in conjunction with the accompanying drawings.

DESCRIPTION OF THE PREFERRED EMBODIMENT

The preferred embodiment of the present invention relates to a self aligning vacuum nozzle which pivots to pick up and move electronic components within an automated assembly operation while preserving the alignment of the components. A more detailed understanding of the invention may be had from the following description of the preferred embodiment to be understood in conjunction with the accompanying drawings.

Figure 1:
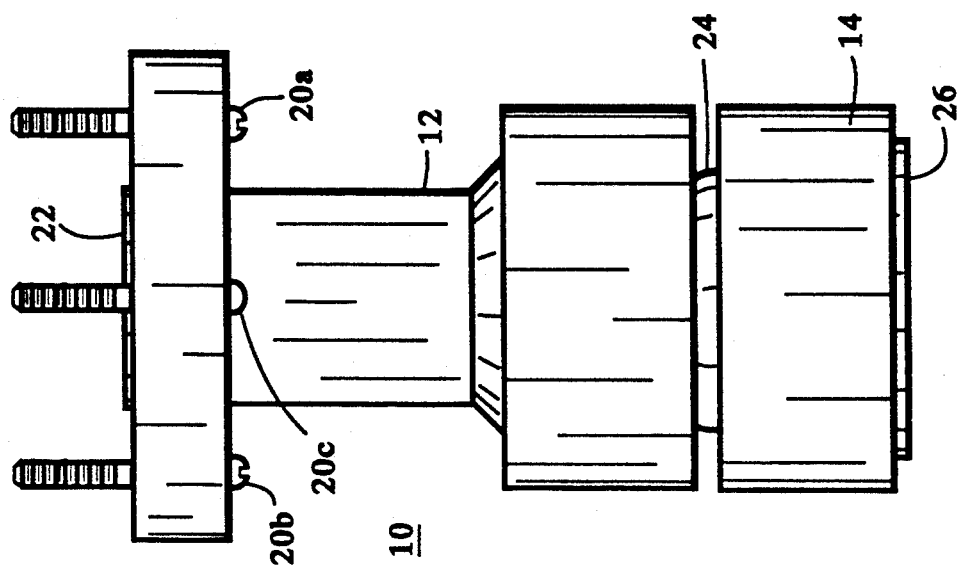
FIG. 1 shows a side view of the end effector with the nozzle tip in a normal, unbiased position.

Referring now to FIG. 1, an end effector, generally designated 10, is comprised of two basic parts: nozzle base 12, which is a slightly elongated, generally cylindrical member, and nozzle tip 14. An enlarged diameter flange 16 forms the upper portion of nozzle base 12, and has screws 20a, 20b, 20c passing therethrough, which are for attaching end effector 10 to the device on which it is to be mounted, a robotic arm for example (see FIGS. 4A-4C). As will be explained in greater detail in connection with FIGS. 4A-4C, the robotic arm on which end effector 10 is mounted can be coupled to and thereby supply a vacuum source which enables end effector 10 to pick up components. Also shown on FIG. 1 is base seal 22 which is a resilient, rubber-like quad ring. The durometric characteristics of base seal 22 are such that it can effect an air tight seal when nozzle base 12 of end effector 10 is affixed to a robotic arm.

The other part of end effector 10 is nozzle tip 14, which has a ball portion 24 which is generally, semi-spherically shaped so that it is capable of pivotal movement when positioned in nozzle base 12, as shown on FIG. 1. The other end of nozzle tip 14 is the portion of end effector 10 which comes into physical contact with the components that are to be picked up by end effector 10. This end of nozzle tip 14 has another rubber like quad ring, referred to as tip seal 26 which assists in making an air tight seal between nozzle tip 14 of end effector 10 and the component which is to be picked up, when the two are brought together. As with base seal 22, the durometric characteristics of tip seal 26 are such that it can effect a vacuum seal when a component is picked up.

Figure 2:
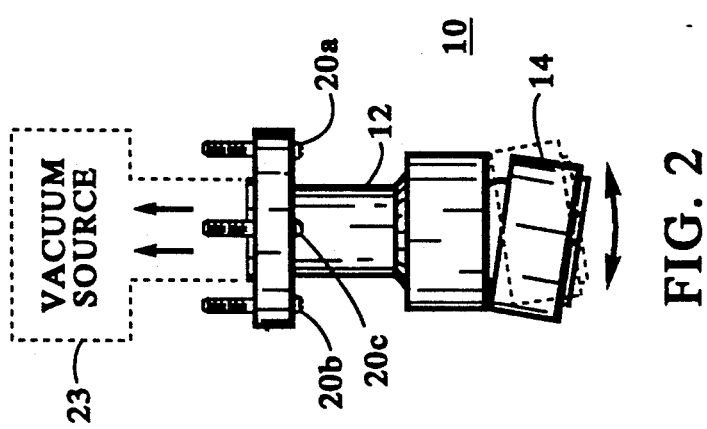
FIG. 2 shows a side view of the end effector of FIG. 1 with the nozzle tip biased to the left side, and, in phantom, biased to the fight side, illustrating the pivotal movement of the end effector.

FIG. 2 shows a reduced scale view of the end effector of FIG. 1 with nozzle tip 14 angled to one side showing its ability to pivotally move, while the extent of its opposite pivotal movement is suggested by the phantom portion of the illustration and the arrows shown on the drawing. Given its two dimensional limitations, FIG. 2 only shows the side to side movement of which nozzle tip 14 is capable. Nevertheless, because ball portion 24 is generally, semi-spherically shaped, nozzle tip 14 is capable of pivotal movement, not just the two dimensional, side to side movement shown in FIG. 2. This is the pivotal movement that enables nozzle tip 14 to adjust its position under contact pressure and align with the surface of the component which it is picking up when end effector 10 is lowered onto the component, as will be discussed in connection with FIGS. 4A-4C.

Also shown in FIG. 2 in dashed lines is the location of a vacuum source 23 and arrows indicating the direction of the vacuum force when the vacuum is effected.

Figure 3:
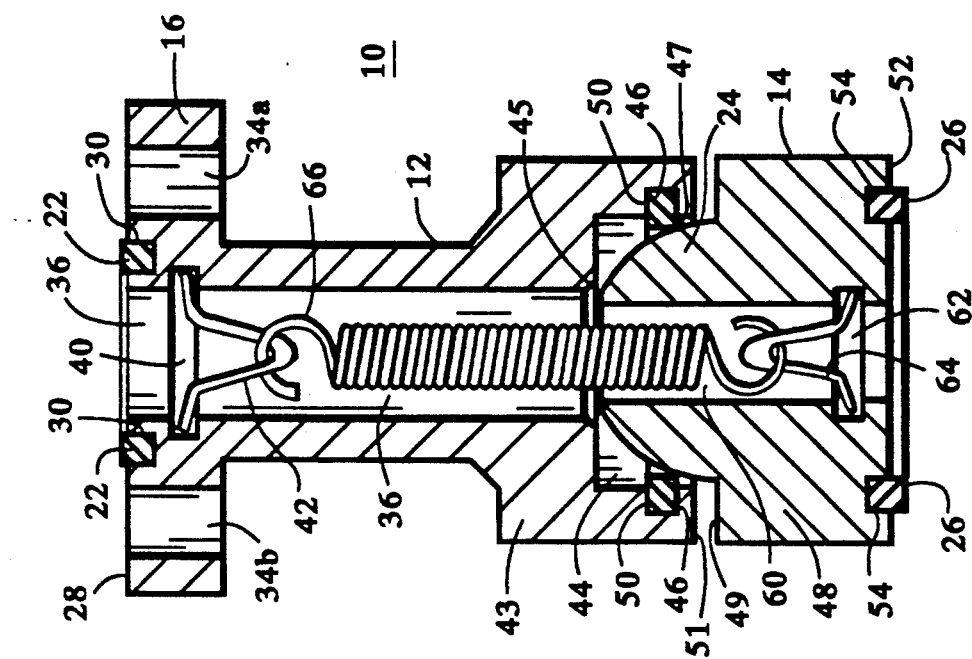
FIG. 3 shows a side, sectional view of the end effector of FIG. 1 with the nozzle tip in a normal, unbiased position.

FIG. 3 is a cross sectional view of end effector 10 showing its interior and thereby better revealing the way nozzle base 12 and nozzle tip 14 are put together. The upper surface of end effector 10, which is configured for joining with the robotic arm, forms joining surface 28. Joining surface 28 has a circular groove cut into it forming base seal channel 30. Base seal 22 is positioned in base seal channel 30 such that although base seal 22 is snugly positioned therein, a portion of base seal 22 extends above joining surface 28, so that it will mate with a like surface of the robotic arm on which end effector 10 is affixed and create an air tight seal. Shown also are screw holes 34a, 34b, which are disposed through flange 16 and are the holes in which screws 20a, 20b, respectively, are positioned.

Disposed through and about the longitudinal center of nozzle base 12 is base passageway 36 which is a generally, cylindrically shaped, hollowed cavity which extends from the end of nozzle base 12 which attaches to the robotic arm to the opposite end which couples with nozzle tip 14. Although in the preferred embodiment base passageway 36 is cylindrically shaped, it need not be so as long as base passageway 36 forms a channel through which negative air pressure is communicated when end effector 10 is attached to a vacuum source supplied by a robotic arm, as will be discussed in connection with FIGS. 4A-4C. The upper portion of base passageway 36 includes retainer grove 40, which forms a circular channel in the interior of base passageway 36 having a diameter larger than the diameter of base passageway 36. Positioned in retainer groove 40 is generally V-shaped, spring retainer 42, having oppositely disposed free ends configured and dimensioned for being captively received within groove 40, and retained therein under spring action.

The other end of nozzle base 12 is an enlarged cylindrically configured base portion 43 which, on the interior thereof, includes bore enlargement 44, which has an enlarged diameter relative to base passageway 36. Bore enlargement 44 is in fluid flow communication with base passageway 36 such that a vacuum applied at the opening of base passageway 36 in joining surface 28 will be communicated to bore enlargement 44. As seen in FIG. 3, at the juncture of base passageway 36 and bore enlargement 44, the cylindrical wall of base passageway 36 has beveled edge 45, which is substantially contoured to the shape of ball portion 24.

In the preferred embodiment bore enlargement 44 is a generally cylindrically shaped cavity having the same longitudinal center line as the longitudinal center line as base passageway 36. In alternate embodiments of the present invention, the cavity formed by bore enlargement 44 need not be cylindrical, and it need not be on the same center line as base passageway 36.

Around the interior perimeter of bore enlargement 44 and adjacent to the end of base passageway 36 is a circular groove formed by bore seal channel 50, which is also on the same center line as base passageway 36. Captively retained in bore seal channel 50 is bore seal 46, which is another rubber-like quad ring. Bore seal 46 is dimensioned relative to the depth of bore seal channel 50 so that when bore seal 46 is positioned in bore seal channel 50 a portion of bore seal 46 radially protrudes inward beyond the interior walls of bore enlargement 44 toward its longitudinal center line.

The portion of bore seal 46 which extends inwardly beyond the interior walls of bore enlargement 44 defines a ring opening which has a diameter less than the diameter of ball portion 24. When nozzle base 12 and nozzle tip 14 are attached as shown in FIG. 3, ball portion 24 abuts against bore seal 46 at its inner perimeter edge 47 and a portion of ball portion 24 extends into the ring opening. Moreover, when so attached, ball portion 24 is able to pivotally move as the semi-spherical surface of ball portion 24 slidably abuts against the opening of the ring formed by bore seal 46. The durometric characteristics of bore seal 46 are such that it is sufficiently compliant to assist in maintaining an air tight seal between nozzle base 12 and nozzle tip 14, while being sufficiently hard so that it does not unduly restrict the pivotal movement of nozzle tip 14.

During routine operation ball portion 24 of nozzle tip 14 will not be pushed so far within bore enlargement 44 that the top of ball portion 24 comes in contact with the inner walls of bore enlargement 44. If such contact pressure were caused by the engagement of nozzle tip 14 with the top of a component that was being picked up, it is possible that the component could be damaged through crushing or cracking. On the other hand, if such contact pressure does occur, and ball portion 24 is pushed as far as it can go within the recess formed by bore enlargement 44, the top of ball portion 24 will contact beveled edge 45. Given that beveled edge 45 is substantially contoured to the semi-spherical shape of ball portion 24, nozzle tip 14 will still be able to pivot through the slidable abutting contact of the top of ball portion 24 against beveled edge 45.

Still referring to FIG. 3, through the sectional view it can be seen that ball portion 24 of nozzle tip 14 is only partly, semi-spherically shaped; it is actually a truncated semi-sphere with the upper most portion of the semi-sphere cut away. As described above, ball portion 24 is dimensioned and configured such that it fits within bore enlargement 44, and snugly fits against edge 47 of the interior ring shaped surface of the opening of bore seal 46. The surface of ball portion 24 is smooth enough so that its surface friction against bore seal 46 does not unduly restrict its movement.

Nozzle tip 14 further has an enlarged, cylindrically configured body portion 48, the diameter of which is greater than the diameter of ball portion 24 and is approximately the same as the diameter of base portion 43. As can be seen by reference to FIG. 2, the pivoting movement of nozzle tip 14 with respect to nozzle base 12 is restricted by the contact of the upper edge 49 of body portion 48 with the outer surface 51 of base portion 43.

The end of body portion 48 of nozzle tip 14 which is opposite to ball portion 24 is contact surface 52, which is the portion of end effector 10 which makes contact with the component to be picked up. As shown, contact surface 52 has a circular groove cut into it, referred to as tip seal channel 54. Tip seal 26 is a quad ring and is positioned in tip seal channel 54 such that although tip seal 26 is snugly positioned therein, a portion of tip seal 56 extends below contact surface 52, so that it will make contact with the component on which end effector 10 is lowered to create an air tight seal. In order to optimize the vacuum force effect, in any given application the diameter of tip seal 26 should be smaller than the contact area of the component that is being picked up.

Like nozzle base 12, disposed through and about the longitudinal center of nozzle tip 14 is tip passageway 60 which is a generally, cylindrically shaped, hollowed cavity which extends from the end of nozzle tip 14 which couples with nozzle base 12 to the opposite end. Again, tip passageway 60 need not necessarily be cylindrical provided that when nozzle base 12 and nozzle tip 14 are attached as shown in FIG. 3, tip passageway 60 continues the channel originating with base passageway 36. In the preferred embodiment, tip passageway 60 is a cylindrical cavity and tip seal channel 54 and tip seal 56 both concentrically surround the circular opening formed by tip passageway 60. In addition, the two passageways are generally aligned so that when end effector 10 is attached to a vacuum source negative air pressure created at the opening of base passageway 36 in joining surface 28 will be communicated through base passageway 36 and tip passageway 60, and thereby effect a vacuum force at contact surface 52.

As shown in FIG. 3, the lower portion of tip passageway 60 of nozzle tip 14 includes retainer grove 62, which forms a circular channel in the interior of tip passageway 36 at a distance from contact surface 52. A second V-shaped spring retainer 64 has its free ends captively retained within groove 62. Attached between spring retainer 42, which is in nozzle base 12, and spring retainer 64, which is in nozzle tip 14, is tension spring 66. Although the friction force between bore seal 46 and ball portion 24 is usually sufficient to keep nozzle base 12 and nozzle tip 14 attached to one another, spring 66 insures that these two parts of end effector 10 stay coupled together.

As can be seen by referring to FIGS. 1-3, when end effector 10 is assembled, nozzle tip 14 is coupled to nozzle base 12 by placing ball portion 24 into bore enlargement 44 such that ball portion 24 comes in contact with edge 47 of the opening of bore seal 46. The two parts of end effector 10, nozzle base 12 and nozzle tip 14 are reliably kept together through the attachment of tension spring 66. In this fashion, nozzle tip 14 has the freedom to pivotally move as discussed above, but nozzle tip 14 will not separate from nozzle base 12.

Figure 4C:
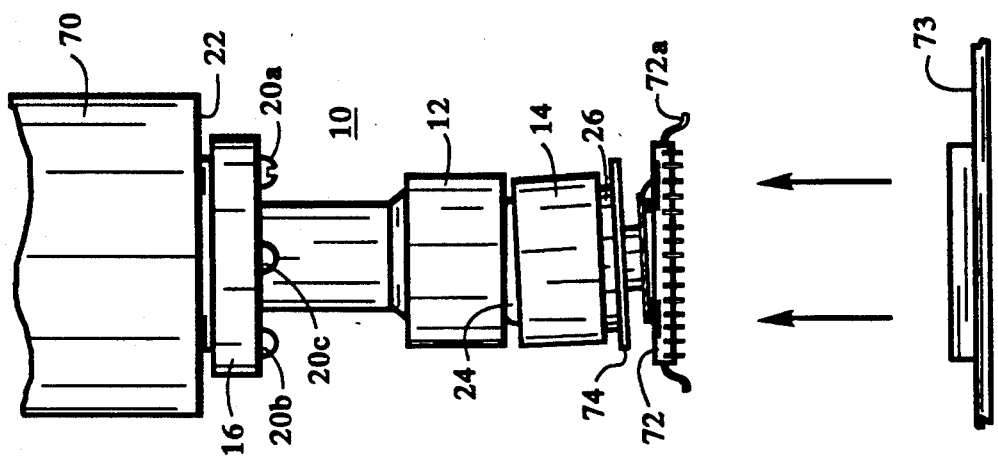
FIGS. 4A, 4B, and 4C show the end effector of FIG. 1 attached to a robotic arm and a sequence of movements of the end effector as it pivotally adjusts to align with the non-aligned surface of a component as it is picked up.
Figure 4B:
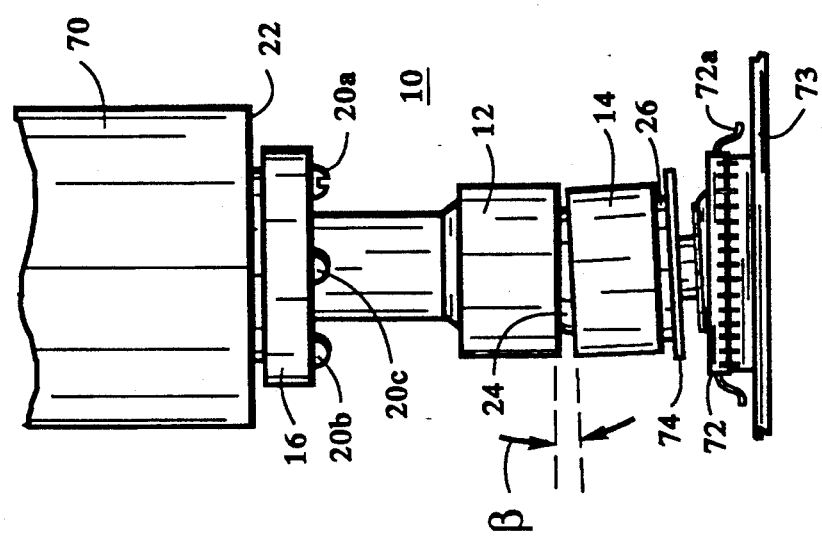
Figure 4A:
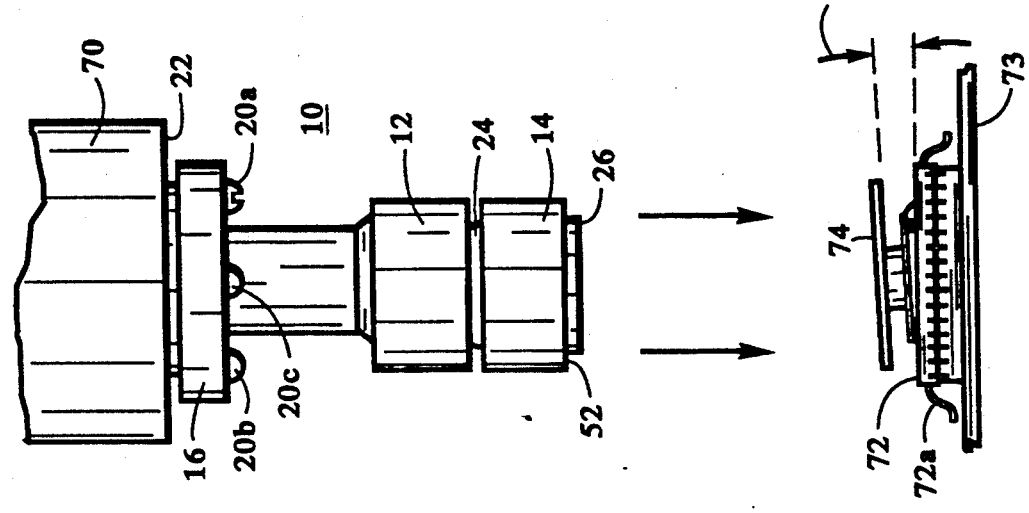

In FIGS. 4A-4C a sequence of drawings illustrates the characteristics of the present invention in actual operation. Referring first to FIG. 4A, end effector 10 is shown fixedly attached to robotic arm 70 through screws 20a, 20b, 20c. In the automated assembly operation illustrated, electronic component 72 passes beneath robotic arm 70 on carrier 73 and is picked up by end effector 10 to be moved to a different stage of the assembly process. Component 72 is shown to have heat sink 74 placed thereon, and, due to an uneven distribution of glue, heat sink 74 is misaligned with the top surface of component 72, and also misaligned with the normal angle of nozzle tip 14. The misalignment of heat sink 74 and component 72 is represented by the angle $\alpha$, shown on FIG. 4A. As suggested by the arrows, in FIG. 4A robotic arm 70 is lowering end effector 10 onto component 72 such that end effector 10 will contact the top surface of heat sink 74.

Robotic arm 70 is coupled to a vacuum source 23 (shown on FIG. 2), which can be activated and deactivated according to the assembly program, and end effector 10 is attached to robotic arm 70 such that the vacuum supplied through robotic arm 70 passes through base passageway 36 and tip passageway 60 to be effected at contact surface 52, shown on FIG. 3.

In FIG. 4B, end effector 10 has been lowered onto component 72, and as a consequence of the contact pressure between nozzle tip 14 and heat sink 74, nozzle tip 14 has pivotally adjusted to mate with the top surface of heat sink 74. The angle of orientation of nozzle tip 14 is represented by the angle $\beta$, which is the same as angle $\alpha$ shown in FIG. 4A indicating the angle of nozzle tip 14 will aligned with heat sink 74. As discussed above in connection with FIG. 3, although nozzle base 12 is firmly affixed to robotic arm 70, the semi-sphere of ball portion 24 will slide against edge 47 of bore seal 46 enabling contact surface 52 of nozzle tip 14 to pivotally move and reorient itself into many different planes. In this fashion, end effector 10 is able to adjust to the angle of the plane formed by the top surface of component 72 and successfully pick it up.

With the vacuum applied, ball portion 24 will be drawn into intimate contact with bore seal 46. This contact is not only necessary to maintain a vacuum seal, but also when end effector 10 picks up component 72 nozzle tip 14 must be kept in the same position in which it was originally situated when it locked onto component 72. This is to insure that while end effector 10 is carrying component 72 from one point to another nozzle tip 14 does not turn within nozzle body 12. Such turning may cause the repositioning of the leads 72a relative to the robotic arm 70. In many automated assembly operations, such as the mounting of integrated circuit devices on a printed circuit board, for example, the original alignment of the component must be maintained by the robotic arm 70 so that each lead of the component can be bonded to a corresponding contact pad on a printed circuit board (not shown). The rotation of nozzle tip 14 within nozzle body 12 after component 72 has been picked up will clearly impair such alignment, and ultimately the proper mounting of component 72. Therefore, the vacuum force and the friction contact of ball portion 24 against bore seal 46 maintain the positioning of nozzle tip 14.

Finally, in FIG. 4C component 72 has been successfully picked up by the vacuum force, and, as suggested by the arrows, is being lifted away by robotic arm 70 to the next stage of the assembly process, such as the placement of component 72 onto a printed circuit board. After so placing component 72, robotic arm 70 would eventually return to the stage of the assembly process shown in FIG. 4A, at which time another component would have been moved into place by carrier 73 for like processing.

The preferred embodiment of the present invention has been discussed in connection with the automated processing of electronic components; however, the invention has much broader application to picking up any work piece which may have a pick up surface which is unaligned with the end effector which it is picking it up. Furthermore, although the invention has been discussed in connection with the robotic arm being lowered onto the work piece, it is possible to implement the invention in applications where the end effector is brought into contact with the work piece from many other orientations. Accordingly, the invention in its broader aspects is not limited to the specific details, representative apparatus, and illustrative examples shown and described herein. Thus, departures may be made from such details without departing from the spirit or scope of the invention.

What is claimed is:

1. A vacuum end effector for picking up and moving a work piece while maintaining alignment of said work piece comprising:
   a nozzle base having a base passageway extending therethrough into a cavity in said nozzle base;
   a nozzle tip having first and second portions, said first portion being generally semi-spherically shaped and having a given diameter, and said second portion having a work piece contact surface, said nozzle tip having a tip passageway extending through said first portion and through said contact surface of said second portion;
   engagement means disposed within said cavity, said engagement means having a circular opening of a diameter less than said diameter of said semi-spherical portion for sealably and slidably engaging said semi-spherical portion of said nozzle tip when said semi-spherical portion is placed in slidable, abutting contact with said opening of said engagement means; and
   retention means at least partially within said cavity for retaining said semi-spherical portion in abutting contact with said opening of said engagement means, said cavity and said tip passageway being configured such that with said semi-spherical portion of said nozzle tip in abutting contact with said opening of said engagement means said base and tip passageways are in fluid flow communication with one another so that a vacuum applied at one end of said base passageway will be communicated to said opening in said contact surface for enabling the pick up of a work piece.

2. The end effector as in claim 1, wherein said engagement means comprises a cavity seal positioned within said cavity, said cavity seal being formed of a rubber like material being sufficiently compliant to effect an air tight seal and being sufficiently hard such that it does not restrict the pivoting movement of said nozzle tip relative to said nozzle base when said nozzle tip makes contact with said work piece.

3. The end effector as in claim 1, wherein said retention means comprises a retention spring coupled between said nozzle base and said nozzle tip.

4. The end effector as in claim 1, wherein said nozzle base includes connection means on said nozzle base for coupling said base passageway to a vacuum source.

5. The end effector as in claim 1, wherein said contact surface includes tip recess means and a tip seal received within said tip recess means, said tip seal being formed of a rubber-like material being sufficiently compliant to effect an air tight seal when said contact surface contacts a work piece.

6. The end effector as in claim 5, wherein said tip seal is a quad ring.

7. The end effector as in claim 3, wherein said cavity, said base passageway, and said tip passageway are each generally cylindrically shaped.

8. The end effector as in claim 7 wherein said retention spring extends within said base passageway, said cavity, and said tip passageway.

9. A vacuum end effector for picking up and moving a work piece while maintaining the alignment of said work piece, said end effector comprising:
   a nozzle base having a first and a second end with a cylindrically configured cavity formed therein, said cavity having an open end; said nozzle base including bore means in fluid flow communication with said cavity;
   a nozzle tip having a first portion and a second portion, said first portion including a generally semi-spherically configured surface, said nozzle tip having bore means extending through said first and second portions to a contact end surface of said second portion;
   means within said cavity for sealably and slidably engaging the semi-spherically configured surface of said first portion of said nozzle tip;
   means within said bore means of said nozzle tip and within one of said cavity and said bore means of said nozzle base for retaining said first portion of said nozzle tip in abutting relation with said sealing means for maintaining a vacuum and for enabling the pivoting of said nozzle tip relative to said nozzle base on contact of said contact surface with a work piece so that said contact surface aligns with a surface of said work piece; and
   means on said nozzle base for connection of said bore means of said nozzle base to a vacuum source, said bore means of said nozzle tip being dimensioned and positioned for providing a vacuum at said contact surface for said end effector to pick up said work piece on movement of said end effector.

10. A vacuum end effector as in claim 9, wherein said means within said cavity comprises a bore seal formed of a material which is sufficiently hard so as not to restrict the pivoting movement of said semi-spherical surface, and sufficiently soft so as to enable a vacuum seal to be created between said nozzle base and said first portion of said nozzle tip.

11. A vacuum end effector as in claim 10, wherein said retention means comprises a retention spring.

12. A vacuum end effector as in claim 11, wherein said connection means comprises a plurality of mounting screws, said mounting screws being capable of attaching said end effector to said vacuum source.

13. A vacuum end effector for picking up and moving a work piece while maintaining the alignment of said work piece comprising:

a nozzle base having a cylindrically shaped base passageway extending therethrough, said nozzle base having an enlarged cylindrically shaped base portion with a given diameter, said base portion having a cylindrically shaped bore enlargement disposed within said base portion and said bore enlargement being in fluid flow communication with said base passageway, said base passageway, said base portion, and said bore enlargement all having a common longitudinal center line;

a nozzle tip having first and second portions, said first portion being generally semi-spherically shaped with a given diameter, and said second portion being cylindrically shaped with a given diameter, said diameter of said second portion being the same as said diameter of said base portion, said second portion having a work piece contact surface, said nozzle tip having a cylindrically shaped tip passageway extending through said first portion and through said contact surface of said second portion;

engagement means within said bore enlargement having a circular opening of a diameter less than said diameter of said semi-spherical portion for sealably and slidably engaging said semi-spherical portion with said semi-spherical portion placed in slidable, abutting contact with said opening of said engagement means; and retention means at least partially within said bore enlargement for retaining said semi-spherical portion in slidable abutting contact with said opening of said engagement means, said bore enlargement and said tip passageway being configured such that with said semi-spherical portion in abutting contact with said opening of said engagement means said base and tip passageways are in fluid flow communication with one another so that a vacuum applied at one end of said base passageway will be communicated to said opening in said contact surface for enabling the pick up of a work piece.

14. The end effector as in claim 13, wherein said bore enlargement includes recess means and wherein said engagement means comprises a bore seal received within said recess means, said bore seal being formed of a rubber-like material being sufficiently compliant to effect an air tight seal and being sufficiently hard such that it does not restrict the pivoting movement of said nozzle tip relative to said nozzle base when said nozzle tip makes contact with said work piece.

15. The end effector as in claim 14, wherein said pivoting movement of said nozzle tip relative to said nozzle body is limited by the engagement of said base portion with said second portion of said nozzle tip when said nozzle tip makes contact with said work piece.

16. The end effector as in claim 14, wherein said retention means comprises a retention spring coupled between said nozzle base and said nozzle tip.

17. The end effector as in claim 16, wherein one end of said spring is captively retained in said base passageway and the other end of said spring is captively retained in said tip passageway, and said spring is disposed through said base passageway and said tip passage.

18. The end effector as in claim 17, wherein said contact surface includes tip recess means and a tip seal received within said tip recess means, both said tip recess means and said tip seal being generally ring shaped and concentric with said opening in said contact surface, said tip seal being formed of a rubber-like material being sufficiently compliant to effect an air tight seal when said tip seal contacts a work piece.

19. The end effector as in claim 13, wherein at the junction of said base passageway and said bore enlargement said base passageway has a beveled edge contoured to the shape of said semi-spherical portion.

20. The end effector as in claim 19, wherein said beveled edge is positioned and configured such that with said semi-spherical portion of said nozzle tip inserted as far as possible within said bore enlargement, said semi-spherical portion is in abutting contact with said beveled edge such that said semi-spherical portion pivots against said beveled edge when the position of said nozzle tip relative to said nozzle base is biased by contact pressure from said work piece.

21. A vacuum end effector for picking up and moving a work piece while maintaining alignment of said work piece comprising:

a nozzle base having a base passageway extending therethrough into a cavity in said nozzle base;

a nozzle tip having first and second portions, said first portion being generally semi-spherically shaped and having a given diameter, and said second portion having a work piece contact surface, said nozzle tip having a tip passageway extending through said first portion and through said contact surface, said contact surface having a tip recess means and a tip seal received within said tip recess means, said tip seal being formed of a rubber-like material being sufficiently compliant to effect an air tight seal when said contact surface contacts a work piece;

engagement means disposed within said cavity, said engagement means having a circular opening of a diameter less than said diameter of said semi-spherical portion for sealably and slidably engaging said semi-spherical portion of said nozzle tip when said semi-spherical portion is placed in slidable, abutting contact with said opening of said engagement means; and retention means at least partially within said cavity for retaining said semi-spherical portion in abutting contact with said opening of said engagement means, said cavity and said tip passageway being configured such that with said semi-spherical portion of said nozzle tip in abutting contact with said opening of said engagement means said base and tip passageways are in fluid flow communication with one another so that a vacuum applied at one end of said base passageway will be communicated to said opening in said contact surface for enabling the pick up of a work piece.

22. The end effector of claim 21, wherein said tip seal is a quad ring.

23. A vacuum end effector for picking up and moving a work piece while maintaining the alignment of said work piece, said end effector comprising:

a nozzle base having a first and a second end with a cylindrically configured cavity formed therein, said cavity having an open end; said nozzle base including bore means in fluid flow communication with said cavity;

a nozzle tip having a first portion and a second portion, said first portion including a generally semi-spherically configured surface, said nozzle tip having bore means extending through said first and second portions to a contact end surface of said second portion;

a bore seal formed of a material which is sufficiently hard so as not to restrict the pivoting movement of said semi-spherical surface, and sufficiently soft so as to enable a vacuum seal to be created between said nozzle base and said first portion of said nozzle tip;

a retention spring within said bore means of said nozzle tip and within one of said cavity and said bore means of said nozzle base for retaining said first portion of said nozzle tip in abutting relation with said sealing means for maintaining a vacuum and for enabling the pivoting of said nozzle tip relative to said nozzle base on contact of said contact surface with a work piece so that said contact surface aligns with a surface of said work piece; and a plurality of mounting screws disposed through said nozzle base for connection of said bore means of said nozzle base to a vacuum source, said bore means of said nozzle tip being dimensioned and positioned for providing a vacuum at said contact surface for hid end effector to pick up said work piece on movement of said end effector.

* * * * *